(12) United States Patent
Bairley et al.

(10) Patent No.: US 11,655,737 B2
(45) Date of Patent: May 23, 2023

(54) HEAT EXCHANGER WITH INNER SENSOR GRID AND RESTRAINTS FOR SENSOR WIRES AND HEAT EXCHANGE TUBES

(71) Applicant: General Electric Company, Schenectady, NY (US)

(72) Inventors: Donald William Bairley, Southington, CT (US); Scott William Herman, Enfield, CT (US); Robert William Moore, Spartanburg, SC (US); Kwangsuk Jin, Changwon-si (KR); Patrick Neil Gallagher, Haddam, CT (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 16/942,986

(22) Filed: Jul. 30, 2020

(65) Prior Publication Data

US 2022/0034241 A1    Feb. 3, 2022

(51) Int. Cl.
  *F01K 23/10*    (2006.01)
  *F28F 9/013*    (2006.01)
  *F28F 27/00*    (2006.01)

(52) U.S. Cl.
  CPC .............. *F01K 23/10* (2013.01); *F28F 9/013* (2013.01); *F28F 9/0131* (2013.01); *F28F 27/00* (2013.01)

(58) Field of Classification Search
  CPC ......... F28F 9/0131; F28F 27/00; F22B 37/38; G01K 1/14; G01K 1/143; F23G 5/48; F23G 5/50; F23G 2207/101
  See application file for complete search history.

(56) References Cited

U.S. PATENT DOCUMENTS

| | | | |
|---|---|---|---|
| 9,509,923 B2 | 11/2016 | Pandey et al. | |
| 2014/0020883 A1 | 1/2014 | Christensen et al. | |
| 2014/0120007 A1* | 5/2014 | Valensa | F28F 1/32 29/890 |
| 2020/0400511 A1* | 12/2020 | Uno | G01K 1/026 |

FOREIGN PATENT DOCUMENTS

| | | | |
|---|---|---|---|
| CN | 102853943 A | | 1/2013 |
| GB | 1008513 A * | | 1/1962 |
| JP | 2013170800 A * | | 9/2013 |
| WO | WO-2016027763 A1 * | | 2/2016 ............. F22B 37/38 |

* cited by examiner

*Primary Examiner* — Eric S Ruppert
(74) *Attorney, Agent, or Firm* — James Pemrick; Charlotte Wilson; Hoffman Warnick LLC

(57) ABSTRACT

A heat exchanger includes a sensor grid with sensor leads extending through tube restraints for heat exchange tubes in the heat exchanger. The tube restraint includes a body having a plurality of tube openings defined therein with each tube opening receiving one heat exchange tube of the set of heat exchange tubes therethrough. The body also includes a sensor lead opening defined therein to receive a sensor lead therethrough. Each tube opening has a larger dimension than the sensor lead opening. The sensor grid is installed during manufacture rather than in the field, allowing the sensor grid to be on outermost and inner sets of heat exchange tubes in the heat exchanger.

16 Claims, 9 Drawing Sheets

HEAT EXCHANGER WITH INNER SENSOR GRID AND RESTRAINTS FOR SENSOR WIRES AND HEAT EXCHANGE TUBES

TECHNICAL FIELD

The disclosure relates generally to heat exchangers and, more particularly, to a heat exchanger including a sensor grid with sensor lead(s) extending through opening(s) in tube restraints for heat exchange tubes in the heat exchanger. The sensor grid is installed during manufacture rather than in the field, allowing the sensor grid to be on outermost and inner sets of heat exchange tubes in the heat exchanger.

BACKGROUND

Convective heat exchangers include multiple rows of heat exchange tubes in close proximity to one another. While applicable to any heat exchanger, to illustrate the challenges and benefits of embodiments of the disclosure, the disclosure will consider a heat exchanger in the form of a heat recovery steam generator (HRSG) in a combined cycle power plant (CCPP) including a gas turbine (GT) system and a steam turbine (ST) system. In this setting, efficiency of the HRSG varies due to a number of operating parameters. In the CCPP example, heat input may vary due to operating parameters such as but not limited to: GT system load, ambient temperature, GT system degradation, GT system modification/uprating, duct burner load, and deviations between expected and actual operation. Similarly, heat exchange efficiency within the HRSG may vary due to operating parameters of the HRSG, such as its cleanliness.

Managing operations of the CCPP and the heat exchanger to achieve high efficiency performance requires use of sensors in the heat exchanger to measure a variety of operational parameters of the heat exchange process such as, but not limited to, temperature, pressure, flow velocity, etc. Current practice is to mount a sensor grid on the outermost rows of heat exchange tubes on the HRSG in the field, i.e., after the HRSG is assembled at a site where it will be used. Each sensor has sensor leads extending therefrom. The manual installing of the sensors and running of the sensor leads through (and out of) the HRSG typically requires scaffolding or other high-lift equipment to be employed next to the heat exchange tubes, which can be, for example, 10-25 meters in height. Sensors are mounted on only the outermost rows of heat exchangers because it is nearly impossible to reach within the rows of heat exchange tubes once they are assembled. Consequently, measurement of operational characteristics of the heat exchange process within the inner rows of heat exchange tubes is not available, which limits understanding of how best to control operations of the CCPP or the heat exchanger that impact the heat exchange process and overall efficiency of the system.

BRIEF DESCRIPTION

An aspect of the disclosure provides a heat exchanger, comprising: a plurality of sets of heat exchange tubes positioned adjacent each other, each set of heat exchange tubes fluidly coupled to at least one end of a header; a sensor grid positioned amongst the plurality of sets of heat exchange tubes, the sensor grid including a plurality of sensors, each sensor including a sensor lead extending therefrom; and a tube restraint for positioning at least one of the plurality of sets of heat exchange tubes relative to an enclosure, the tube restraint including a tube opening for each of the heat exchange tubes of a respective set of heat exchange tubes and a sensor lead opening, wherein at least one sensor lead of the sensor grid extends through the sensor lead opening.

Another aspect of the disclosure provides a combined cycle power plant (CCPP), comprising: a gas turbine system; a steam turbine system; and a heat recovery steam generator (HRSG) coupled to the gas turbine system to create steam for the steam turbine system using an exhaust of the gas turbine system, wherein the HRSG includes: an enclosure configured to direct the exhaust therethrough; a plurality of sets of heat exchange tubes positioned adjacent each other in the enclosure, each set of heat exchange tubes fluidly coupled to at least one end of a header; a sensor grid positioned amongst the plurality of sets of heat exchange tubes, the sensor grid including a plurality of sensors, each sensor including a sensor lead extending therefrom; a tube restraint for positioning at least one of the plurality of sets of heat exchange tubes relative to the enclosure, the tube restraint including a tube opening for each of the heat exchange tubes of a respective set of heat exchange tubes and a sensor lead opening, wherein at least one sensor lead of the sensor grid extends through the sensor lead opening.

Another aspect of the disclosure provides a tube restraint for a set of heat exchange tubes of a heat exchanger, the tube restraint comprising: a body; a plurality of tube openings defined in the body, each tube opening configured to receive one heat exchange tube of the set of heat exchange tubes therethrough; and a sensor lead opening defined in the body and configured to receive a sensor lead therethrough, wherein each tube opening has a larger dimension than the sensor lead opening.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
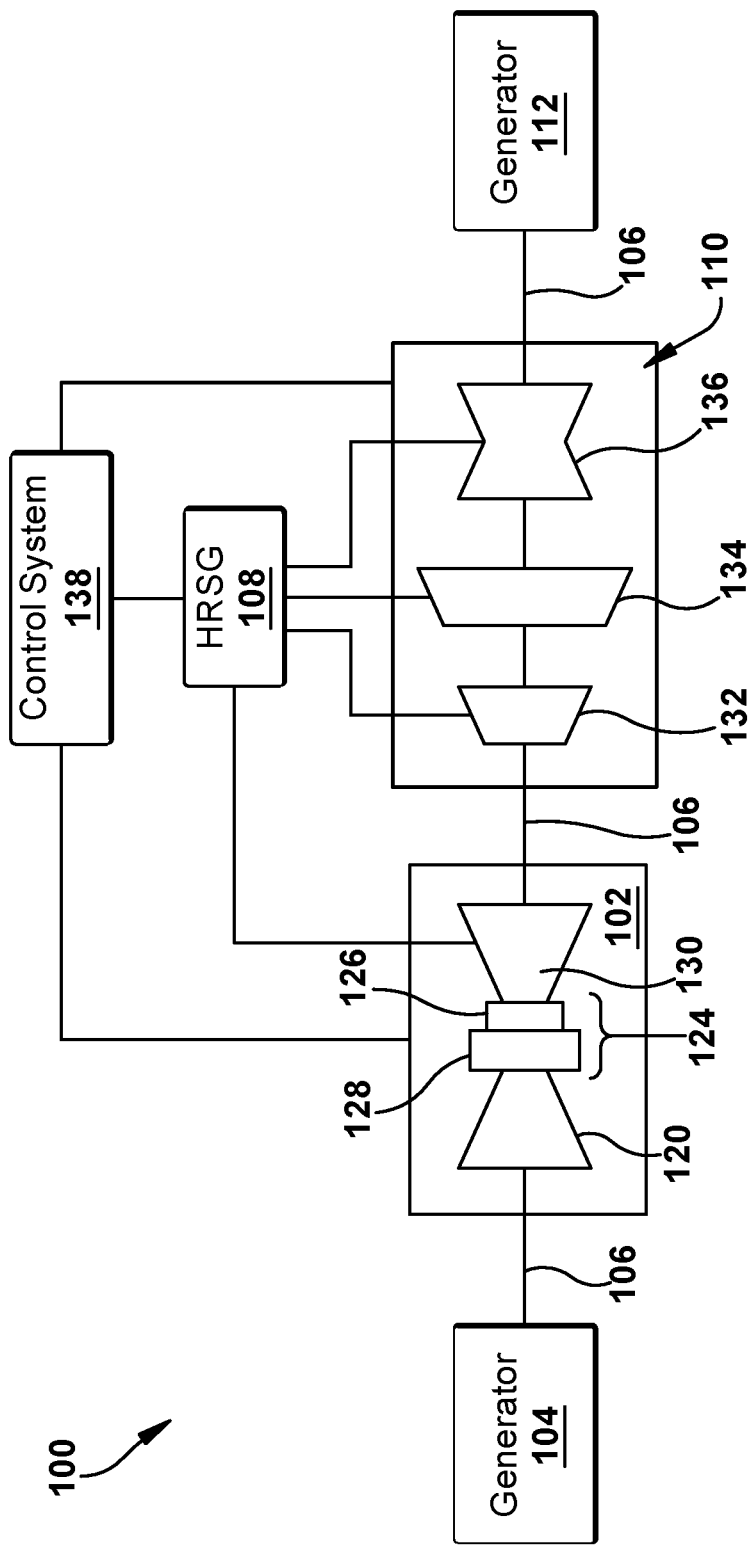
FIG. 1 shows a schematic view of an illustrative application in the form of a combined cycle power plant for a heat exchanger, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing components within an illustrative application in the form of a combined cycle power plant and parts thereof. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as a working fluid through the turbine engine or, for example, the flow of hot gas through a heat exchanger. The term "downstream" corresponds to the direction of flow of the fluid, and the term "upstream" refers to the direction opposite to the flow (that is, the direction from which the flow originates). The terms "forward" and "aft," without any further specificity, refer to directions, with "forward" referring to the front or compressor end of the engine, and "aft" referring to the rearward or turbine end of the engine.

It is often required to describe parts that are located at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or feature may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a heat exchanger including a sensor grid with sensor leads extending through tube restraints for the heat exchange tubes in the heat exchanger. The heat exchanger includes a plurality of sets, e.g., rows, of heat exchange tubes positioned adjacent each other. The tube restraint includes a body having a plurality of tube openings defined therein with each tube opening receiving one of a set of heat exchange tubes therethrough. The body also includes a sensor lead opening defined therein to receive a sensor lead therethrough. Each tube opening has a larger dimension than the sensor lead opening.

The sensor grid includes a plurality of sensors that are installed during manufacture rather than in the field. In this manner, the sensor leads for the sensor grid can be installed through the tube restraints rather than over them. Since each set of heat exchange tubes are accessible during manufacture, as opposed to their installed position in the field, a sensor grid can be mounted to not just outermost sets of heat exchange tubes but also to any of the inner sets of heat exchange tubes in the heat exchanger. With the sensor grid so arranged, more data about the operation of the heat exchanger can be gathered and used to provide more efficient operation of the heat exchanger or power plant in which it is used.

Turning to FIG. 1, a heat exchanger according to embodiments of the disclosure will be described relative to an illustrative application in the form of a combined cycle power plant (CCPP) 100. FIG. 1 shows a schematic view of CCPP 100. It is emphasized that the teachings of the disclosure are applicable to any heat exchanger. CCPP 100 may include a gas turbine (GT) system 102 operably connected to a generator 104, and a steam turbine (ST) system 110 operably coupled to another generator 112. Generator 104 and GT system 102 may be mechanically coupled by a shaft 106, which may transfer energy between a drive shaft (not shown) of GT system 102 and generator 104.

It is understood that generators 104, 112 and shaft 106 may be of any size or type known in the art and may differ depending upon their application or the system to which they are connected. Common numbering of the generators and shafts is for clarity and does not necessarily suggest these generators or shafts are identical. In the illustrative application, CCPP 100 is a single shaft system with two generators, but one with skill in the art will readily understand that the teachings of the disclosure are applicable to any variety of combined cycle power generating systems.

Also shown in FIG. 1, a heat exchanger 108 is operably connected to GT system 102 and ST system 110. As will be described in greater detail herein, heat exchanger 108 may include a heat recovery steam generator (HRSG) (as labeled in drawings) including a sensor grid positioned in accordance with embodiments of the disclosure. Heat exchanger 108 may be fluidly connected to both GT system 102 and ST system 110 via conventional conduits (numbering omitted).

GT system 102 may include a compressor 120 and a combustor 124. Combustor 124 includes a combustion region 126 and a fuel nozzle assembly 128. GT system 102 also includes a gas turbine 130 coupled to common compressor/turbine shaft 106. In one non-limiting example, GT system 102 may be 7HA.03 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies.

In operation, air enters the inlet of compressor 120, is compressed and then discharged to combustor 124 where gaseous or liquid fuel, such as natural gas or oil, is burned to provide high energy combustion gases which drive gas turbine 130. In gas turbine 130, the energy of the hot gases is converted into work, some of which is used to drive compressor 120 through rotating shaft 106, with the remainder available for useful work to drive a load such as generator 104 via shaft 106 for producing electricity.

FIG. 1 also represents CCPP 100 in its simplest form in which the energy in the exhaust gases exiting gas turbine 130 are converted into additional useful work. The exhaust gases enter heat exchanger 108, in the form of an HRSG, in which water is converted to steam in the manner of a boiler. Heat exchanger 108 may also use the energy to create hot feedwater.

ST system 110 may include one or more steam turbines. For example, ST system 110 may include a high pressure (HP) turbine 132, an intermediate pressure (IP) turbine 134 and a low pressure (LP) turbine 136, each of which are coupled to shaft 106. Each steam turbine 132, 134, 136 includes a plurality of rotating blades (not shown) mechanically coupled to shaft 106. In operation, steam from heat exchanger 108, and perhaps other sources, enters an inlet of HP turbine 132, IP turbine 134 and/or LP turbine 136 and is channeled to impart a force on blades thereof, causing shaft 106 to rotate. As understood, steam from an upstream turbine may be employed later in a downstream turbine. Thus, the steam produced by heat exchanger 108 drives at least a part of ST system 110 in which additional work is extracted to drive shaft 106 and an additional load such as second generator 112, which, in turn, produces additional electric power. In some configurations, turbines 130, 132, 134, 136 drive a common generator.

FIG. 1 also shows a CCPP control system 138 operatively coupled to GT system 102, heat exchanger (i.e., HRSG) 108, and ST system 110. Control system 138 may include any now known or later developed computerized controller for providing automated control of CCPP 100. As will be described, control system 138 may receive data from a number of sensors of a sensor grid within heat exchanger 108 and may use the data to control heat exchanger 108 and/or other parts of CCPP 100.

Figure 2:
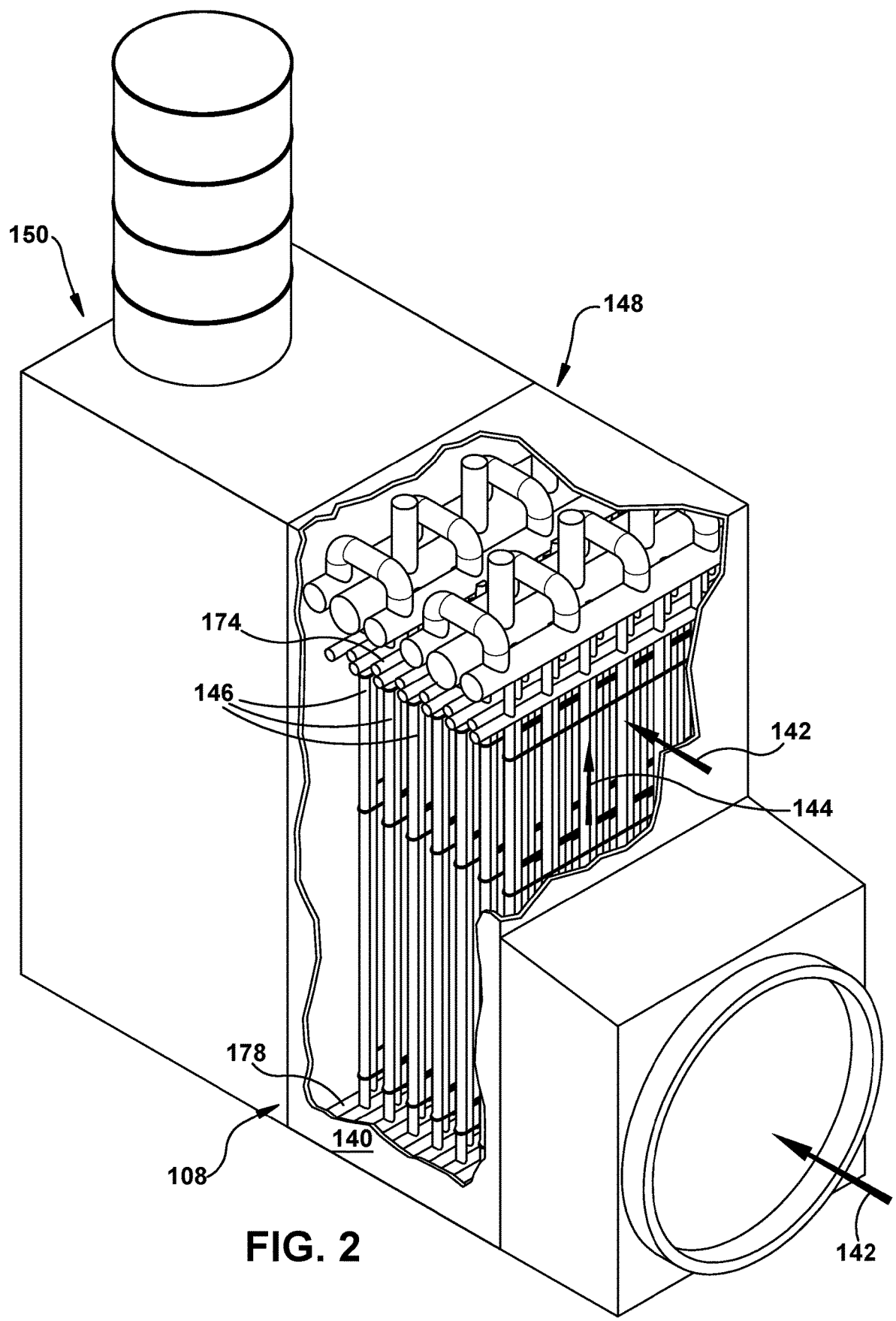
FIG. 2 shows a partially transparent perspective view of a heat exchanger with vertical heat exchange tubes, according to one embodiment of the disclosure.
Figure 3:
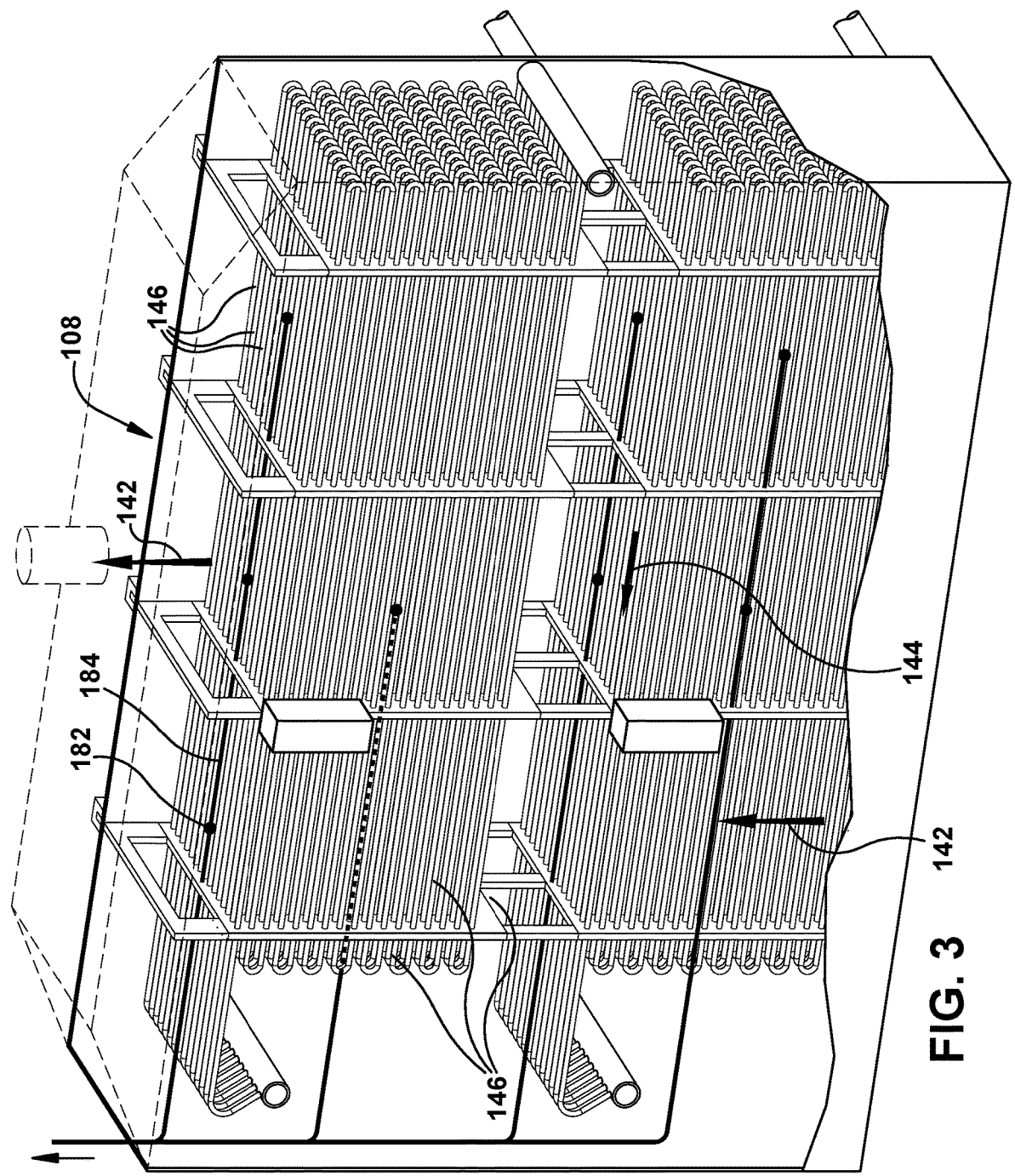
FIG. 3 shows a partially transparent perspective view of a heat exchanger with horizontal heat exchange tubes, according to one embodiment of the disclosure.

FIGS. 2 and 3 show partially transparent, perspective views of embodiments of heat exchanger 108. Heat exchanger 108 is illustrated as an HRSG configured to couple to GT system 102 (FIG. 1) and to deliver steam to, e.g., ST system 110 (FIG. 1) and/or heated water to other parts of CCPP 100 (FIG. 1). As illustrated, heat exchanger 108 includes an insulated enclosure 140 (hereinafter "enclosure 140") configured to contain a fluid 142. Enclosure 140 may be housed in a heat exchanger enclosure 148. Enclosure 140 may include any now known or later developed insulated duct configured to contain fluid 142, e.g., with a carbon steel or stainless steel inner liner, insulation layer and outer carbon steel layer. Heat exchanger enclosure 148 may include any now known or later developed structural protection, e.g., a building or other physical protection.

Fluid 142 may be any form of gas having a heat differential with a fluid 144 (shown by arrows only) passing through a plurality of heat exchange tubes 146 of heat exchanger 108. Heat is exchanged between fluid 142 and fluid 144. Fluid 142 may be combustion gas exhaust from GT system 102 (FIG. 1), and fluid 144 may be a liquid (e.g., water) and/or gas (e.g., steam). Fluid 142 passes over and around the exterior surfaces of a plurality of heat exchange tubes 146 and exits enclosure 140 via an exhaust system 150, e.g., a stack and/or scrubber, etc., while fluid 144 passes through the interior of the plurality of heat exchange tubes 146.

FIGS. 2 and 3 differ in that, in FIG. 2, tubes 146 extend in a vertical direction or arrangement and fluid 142 passes thereabout in a generally horizontal direction, while, in FIG. 3, tubes 146 extend in a horizontal direction or arrangement and fluid 142 passes thereabout in a generally vertical direction. As used herein, "generally" as applied to a flow direction of fluid 142 indicates that the fluid usually travels in the stated direction with some minor or temporary deviations as it passes over or about tubes 146 that may impede its path. While the teachings of the disclosure will be described relative to the FIG. 2 embodiment, it will be readily appreciated that the teachings are equally applicable to the FIG. 3 embodiment.

Tubes 146 may have any now known or later developed form of heat exchange tubes and may be made of any material capable of providing the desired heat transfer characteristics, flexibility, and ability to withstand the environment in which exposed. Tubes 146 may vary in size depending on application, e.g., in some applications varying from 1.25 inches to 2.0 inches in outer diameter.

Figure 4:
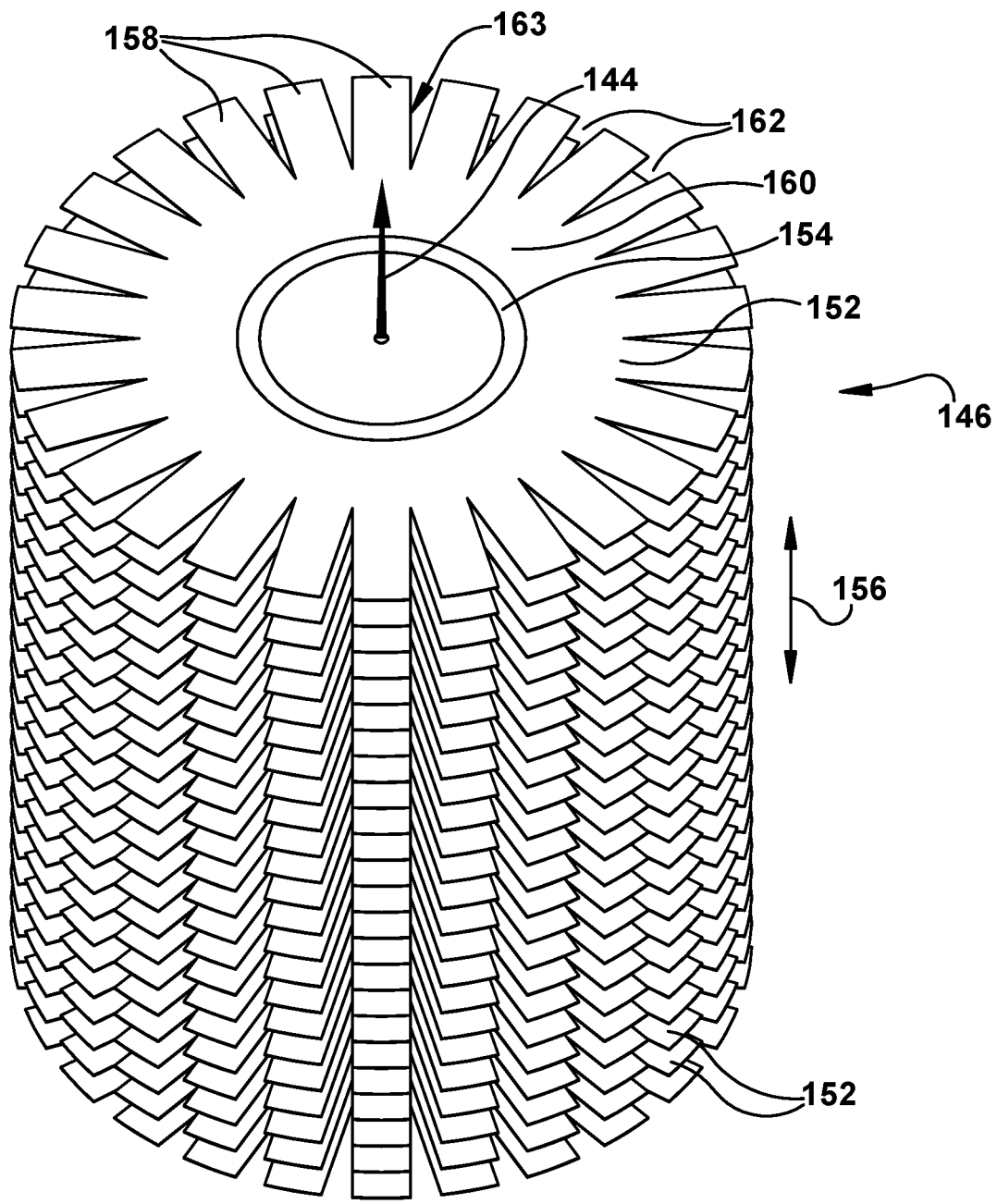
FIG. 4 shows a perspective view of an example prior art heat exchange tube.

FIG. 4 shows a perspective view of one illustrative prior art heat exchange tube in the form of a finned tube. As illustrated, in one non-limiting example, tubes 146 may include a plurality of disks 152 disposed around a center tube 154 aligned in a longitudinal direction 156. Each disk 152 may be substantially planar and may be stacked such that it is disposed longitudinally above and/or below at least one adjacent disk 152. Center tube 154 may include any now known or later developed tubular member configured to allow fluid 144 to pass therethrough, e.g., by pumping or other force. Each disk 152 may include a plurality of fin segments 158 extending radially outward from a disk center portion 160, such that fin segments 158 extend outwardly from center tube 154. Disk center portion 160 extends circumferentially around the outer circumference of center tube 154. Each of fin segments 158 is separated from an adjacent fin segment 158 by a serration 163. Fin segments 158 of adjacent disks can be circumferentially and/or longitudinally aligned or circumferentially and/or longitudinally offset. Fin segments 158 may be arranged in a spiral configuration, an alternating pattern, and/or a random configuration relative to fin segments 158 longitudinally above and/or below them.

Disk(s) 152 may be at least partially composed of carbon steel, alloy steel, stainless steel, aluminum, beryllium, copper, gold, magnesium, iridium, molybdenum, rhodium, silver, tungsten, and/or other suitable materials, as well as alloys thereof. Center tube 154 may be at least partially composed of carbon steel, alloy steel, stainless steel, ferritic stainless, austenitic stainless, and/or other materials that are sufficiently thermally conductive, stress tolerant, and temperature resistant. While one example of a heat exchange tube 146 has been described, it is understood that heat exchanger tubes can take a variety of alternative forms.

Figure 5:
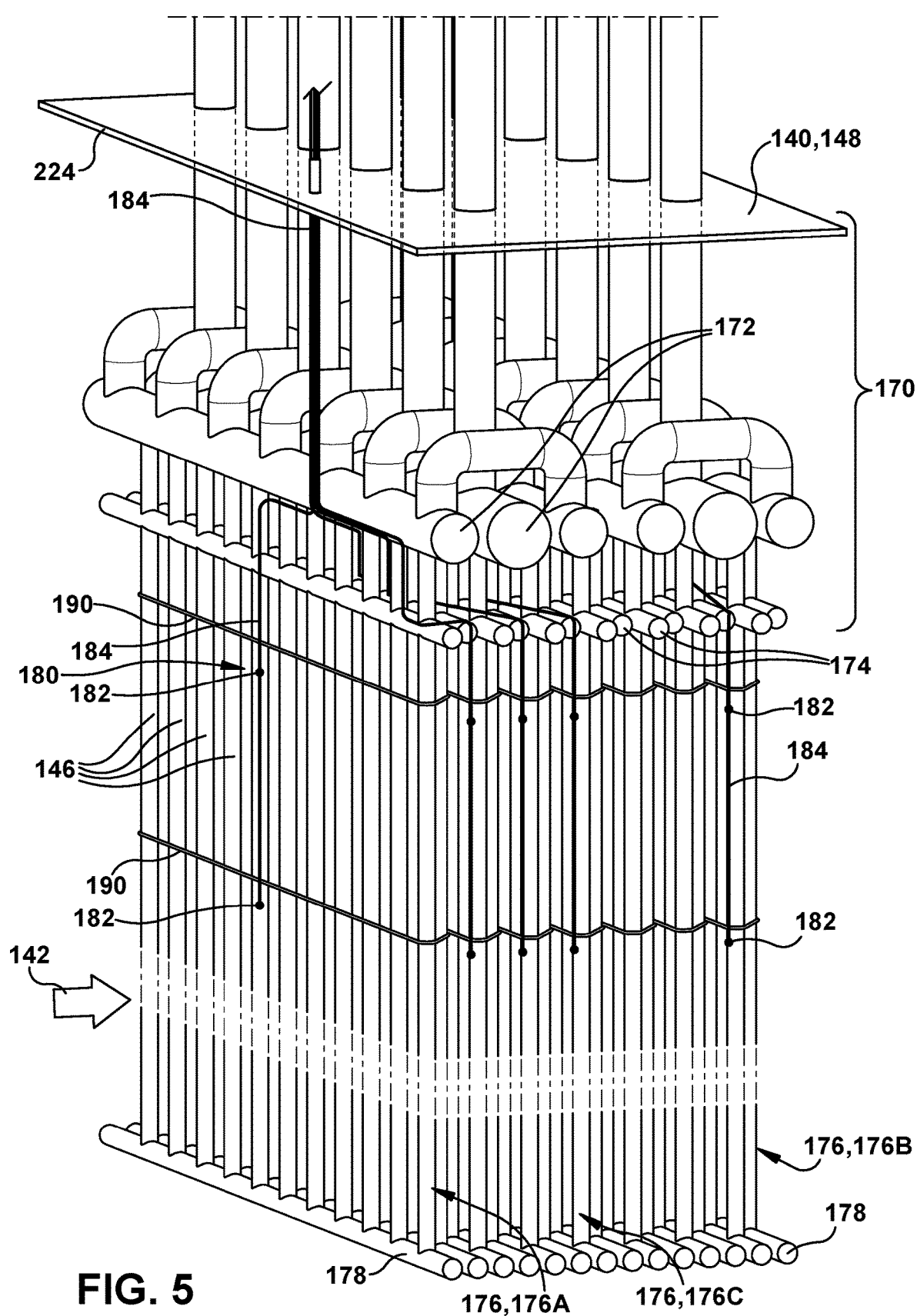
FIG. 5 shows a perspective view of a plurality of sets of heat exchange tubes and a sensor grid for a heat exchanger, according to embodiments of the disclosure.

FIG. 5 shows an enlarged perspective view of an upper portion 170 of heat exchanger 108, sometimes referred to as the vestibule. As illustrated, upper portion 170 includes a number of manifolds or headers that provide distribution of fluid 144 to heat exchange tubes 146. For example, a number of manifolds 172 may direct fluid 144 to or from various upper headers 174. Heat exchanger 108 includes a plurality of sets 176 of heat exchange tubes 146 positioned adjacent each other. Each set 176 of heat exchange tubes 146 is fluidly coupled to an (upper) header 174 at one end thereof. That is, each upper header 174 is in fluid communication with a set 176 of heat exchange tubes 146 to direct fluid 144 to the set of heat exchange tubes 146 from a manifold 172.

In FIG. 5, sets 176 of heat exchange tubes 146 are also in fluid communication with respective lower headers 178, which allows a change in direction of fluid through different tubes 146 within a given set 176 of tubes 146. In the example shown, a set 176 of heat exchange tubes 146 may extend vertically as in FIG. 2, and accordingly together with coupled headers 174, 178 may be referenced as a 'harp' due to the resemblance to a musical harp. In alternative embodiments, tubes 146 may have U-shaped ends rather than lower headers 178, see e.g., FIGS. 3 and 7 (right side).

In the illustrative embodiment, sets 176 of heat exchange tubes 146 share a common manifold (source) 172 of fluid 144 and are arranged in rows with each row having its own respective upper header 174. It is emphasized that the sets 176 of heat exchange tubes 146 do not necessarily have to be in rows, e.g., they can be staggered, randomly arranged, temporarily mis-aligned, etc. Each set 176 may include any number of heat exchange tubes 146, e.g., 38-50 tubes across and arranged in a single row. Each header 174 may be, for example, 2-6 meters long.

Sets 176 of heat exchange tubes 146 include a first outermost set 176A of heat exchange tubes 146, a second outermost set 176B of heat exchange tubes 146 opposite the first outermost set 176A of heat exchange tubes 146, and at least one inner set 176C of heat exchange tubes 146 between first outermost set 176A of heat exchange tubes and second outermost set 176B of heat exchange tubes. Any number of sets 176 of heat exchange tubes 146 may be used. For example, anywhere between 10-30 sets 176 of heat exchange tubes 146 may be provided in line with fluid 142. In the non-limiting example shown in FIG. 5, fourteen (14) sets 176 of heat exchange tubes are illustrated with twelve (12) inner sets 176C.

Figure 6:
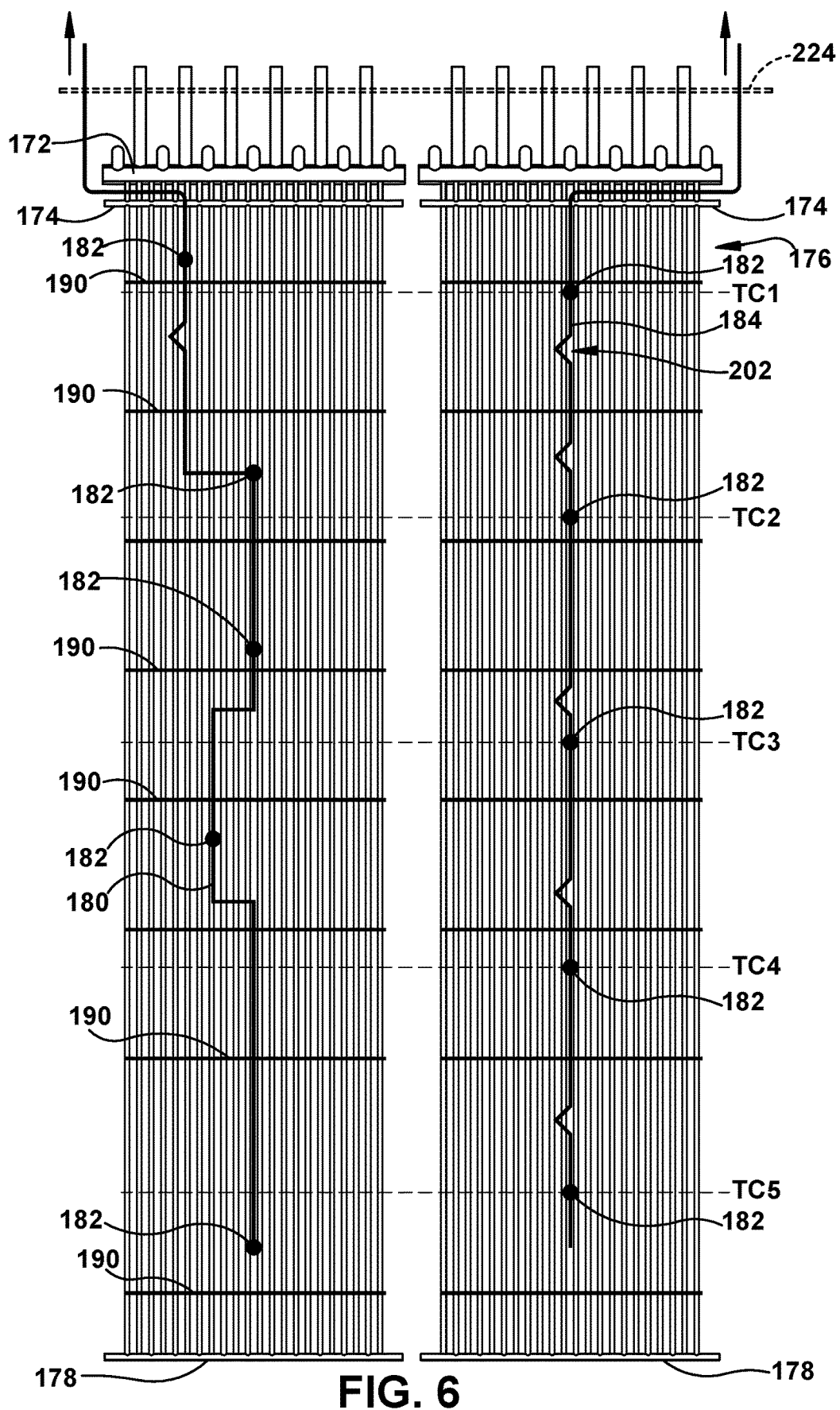
FIG. 6 shows a side view of a pair of sets of heat exchange tubes and a sensor grid for a heat exchanger, according to embodiments of the disclosure.
Figure 7:
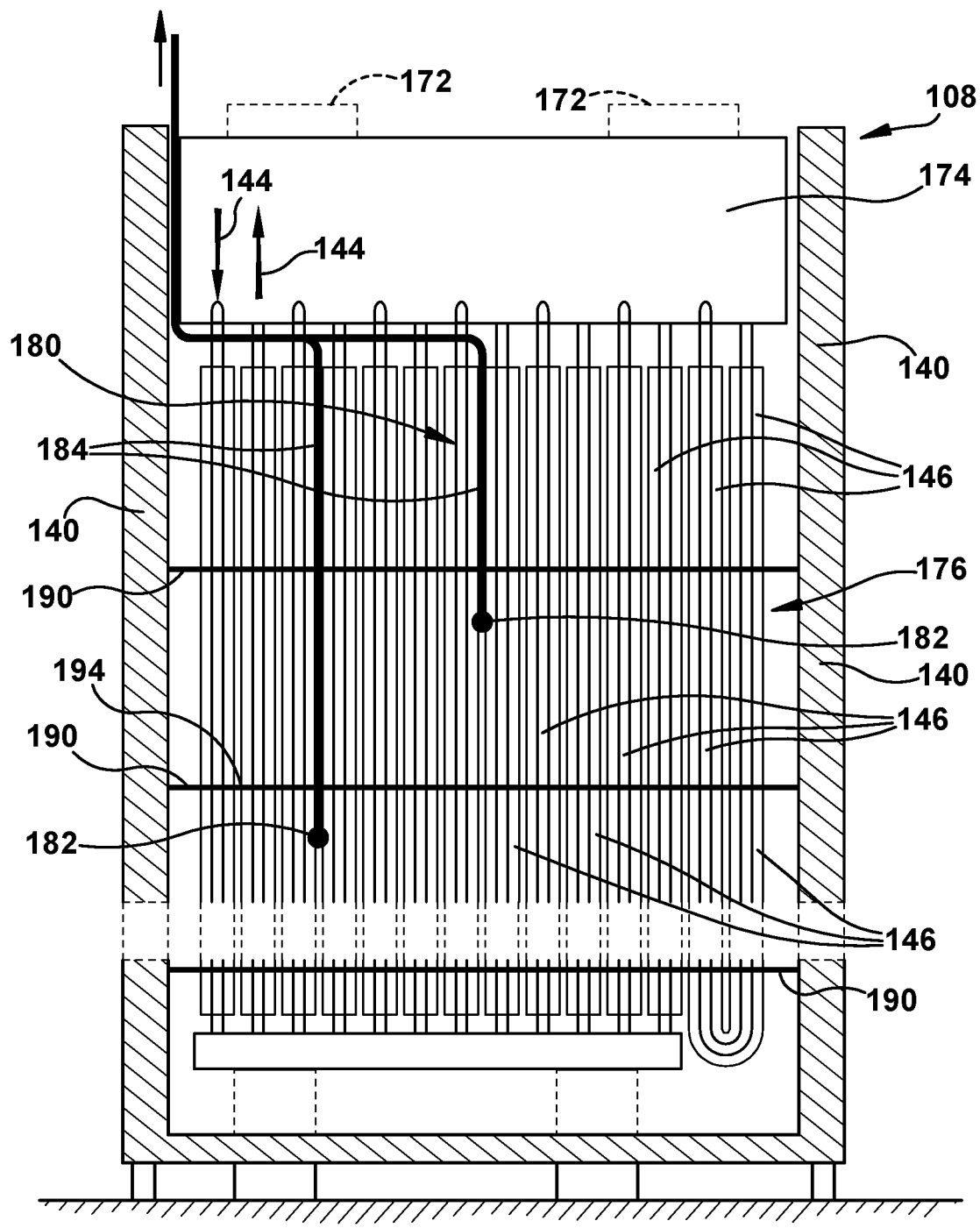
FIG. 7 shows an enlarged side view of a set of heat exchange tubes and a sensor grid for a heat exchanger, according to embodiments of the disclosure.
Figure 8:
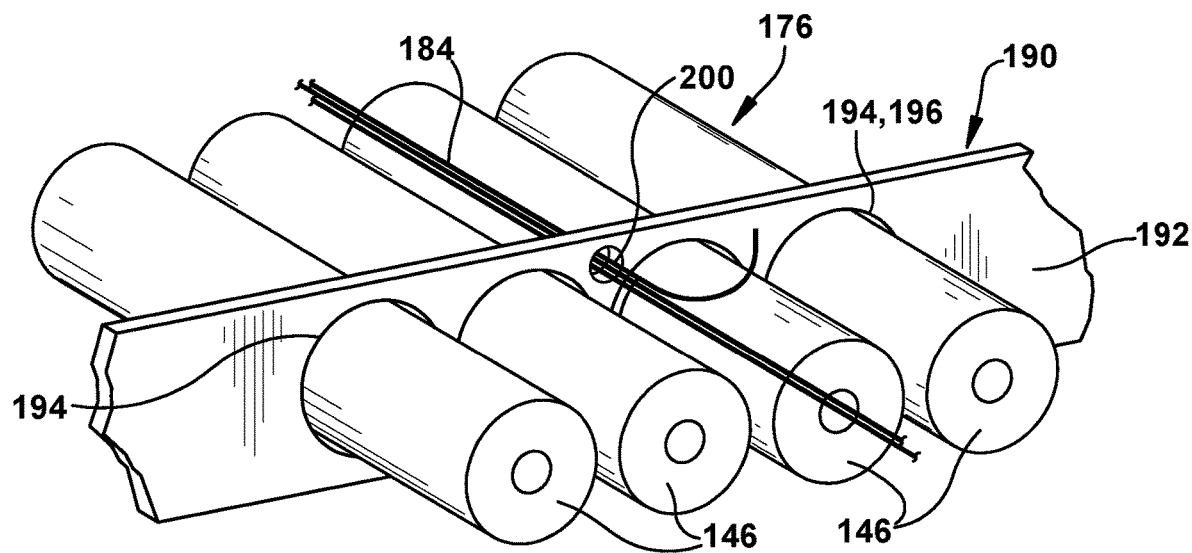
FIG. 8 shows a perspective view of a tube restraint, according to embodiments of the disclosure.

FIG. 6 shows a side view of two sets 176 of heat exchange tubes 146 (side-by-side), FIG. 7 shows an enlarged, partial side view of a set 176 of heat exchange tubes 146, and FIG. 8 shows an enlarged, partial perspective view of a tube restraint 190, according to embodiments of the disclosure. The sets illustrated can be of any set in FIG. 5, outermost or inner. As shown in FIGS. 6 and 7, heat exchanger 108 includes a sensor grid 180 positioned amongst the plurality of set of heat exchange tubes 146. Sensor grid 180 includes a plurality of sensors 182. "Sensor grid" 180 is used in a general manner herein to indicate a distributed layout or arrangement of sensors 182 desired and is not necessarily used to describe sensors 182 arranged in any particular spaced framework.

Each sensor 182 may be any now known or later developed sensor such as but not limited to: thermocouples, resistance temperature detectors (RTD) or other type of temperature sensors; pressure or flow velocity sensors such as pitot tubes; strain gages; gas sampling tubing; etc. Sensors 182 within sensor grid 180 are not necessarily all of the same type. Sensors 182 can measure, for example, fluid temperature, tube or fin metal temperature, gas static pressure, gas velocity, tube or header strain, exhaust gas composition (such as oxygen, NOx, CO, $CO_2$, hydrocarbons), particulates, ammonia slip, etc. Consequently, sensors 182 permit collection of data to determine, for example, heat exchanger 108 section thermal or pressure drop performance, gas temperature or exhaust gas composition distribution for evaluation of burners and emission control equipment, gas velocity distribution, tube or header thermal strain, etc.

Each sensor 182 may include a sensor lead 184 extending therefrom. Sensors 182 may also share a sensor lead 184. Sensor leads 184 may include any form of linear structure capable of communicating with one or more respective sensors 182 and control system 138 (FIG. 1), e.g., an electrical wire with any form of shielding, a pneumatic tube for pitot tube type sensors, etc. Sensors 182 and sensor leads 184 are constructed of appropriate materials to withstand the operational environment of heat exchanger 108.

In accordance with embodiments of the disclosure, sensor grid 180 and its respective sensors 182 can be coupled to one or more sets 176 of heat exchange tubes 146 during manufacture. That is, sensor grid 180 is installed during coupling of heat exchange tubes 146 with a header 174 to form a 'harp' and prior to final installation side-by-side with a plurality of other sets 176 of heat exchange tubes 146 in the field at a power plant. Accordingly, and in contrast to conventional heat exchanger sensor systems, sensor grid 180 of heat exchanger 108, once assembled in the field, may include at least one sensor 182 coupled to at least one heat exchange tube 146 in at least one inner set 176C (FIG. 5) of heat exchange tubes 146. In this manner, operational data can be measured at any location within heat exchanger 108 and from any heat exchange tube 146. Any number of sensors 182 can be used, and sensors 182 can be arranged in any fashion. For example, in FIG. 6, five thermocouples can be spaced vertically at levels TC1-TC5 of any set 176 of heat exchange tubes 146. Sensor leads 184 can be run to any location within heat exchanger 108.

Heat exchanger 108 also includes a tube restraint 190 for positioning at least one of the plurality of sets 176 of heat exchange tubes 146 relative to enclosure 140. Any number of tube restraints 190 may be used within heat exchanger 108 along any given set 176 of heat exchange tubes 146. For example, the partial views of FIGS. 5 and 7 show two tube restraints 190, and FIG. 6 shows eight (8). Tube restraints 190 can be spaced, e.g., vertically as shown, in any manner necessary to support the position of heat exchange tubes 146.

FIG. 8 shows a partial perspective view of a tube restraint 190, according to embodiments of the disclosure. Each tube restraint 190 includes a body 192, and a plurality of tube openings 194 defined in the body. Each tube opening 194 is configured to receive one heat exchange tube 146 of the set 176 of heat exchange tubes 146 therethrough (only some of a set shown in FIG. 8). In the example shown, tube opening 194 is in the form of a hole 196 in body 192. In other embodiments, tube opening 194 may be an open seat, forming a scalloped bar. In any event, tube restraint 190 positions heat exchange tubes 146, and either restrains them from moving in an undesirable manner or allows controlled movement, e.g., through thermal expansion or controlled actuators (not shown).

In contrast to conventional tube restraints, tube restraint 190 may also include a sensor lead opening 200 defined in body 192. Sensor lead opening 200 is configured to receive sensor lead(s) 184 therethrough. Each tube opening 194 has a larger dimension than sensor lead opening 200, e.g., a larger diameter where they are circular. Conventional tube restraints do not require and do not provide sensor lead opening 200 because they are not necessary since sensor leads 184 are coupled to an exterior of the tubes and tube restraints on only the outermost sets of heat exchange tubes.

Since sets 176 of heat exchange tubes 146 are manufactured with sensor grid 180 coupled thereto, sensors 182 of a sensor grid 180 can be positioned anywhere desired on a set 176 of heat exchange tubes 146, and the respective sensor leads 184 can be easily positioned through sensor lead openings 200. Sensor lead openings 200 allow collective routing of sensor leads 184, and protection of the wires during, for example, transport and assembly of heat exchanger 108 in the field. Each sensor lead opening 200 can be sized to accommodate any number of sensor leads 184 to be positioned therethrough. For example, tube restraints 190 closer to a location through which sensor leads 184 will exit enclosure 140 may have larger sensor lead openings 200 to accommodate the sensor leads of any number of downstream sensors 182.

Sensors 182 and sensor leads 184 may be coupled to sets 176 of heat exchange tubes 146 in any now known or later developed manner such as, but not limited to, wire ties to tubes 146 and/or tube restraints 190. Sensors 182 can be operatively positioned, as necessary, to measure the desired operational parameter, e.g., temperature. Sensor leads 184, as shown in the enlarged section of FIG. 6, may include expansion bends 202 therein to accommodate thermal expansion/contraction in heat exchanger 108.

Figure 9:
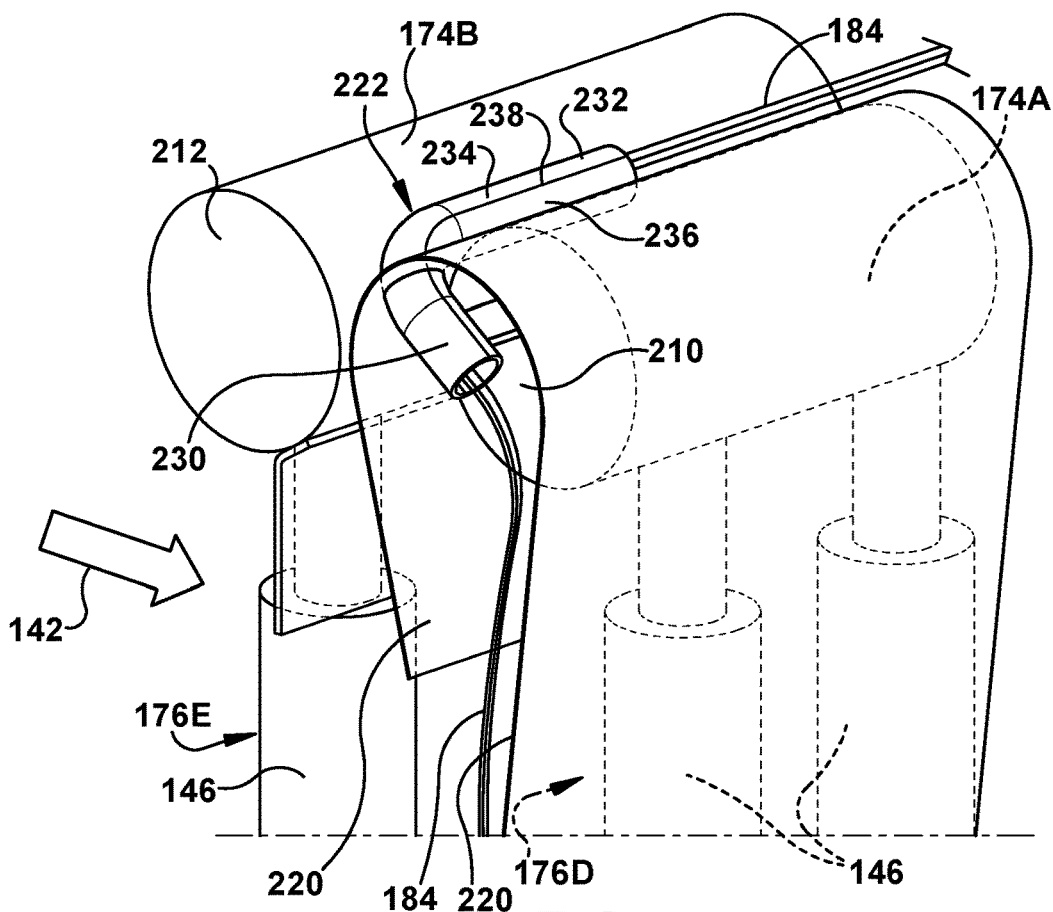
FIG. 9 shows a perspective view of a conduit through a baffle at ends of headers of the heat exchanger, according to embodiments of the disclosure.
Figure 10:
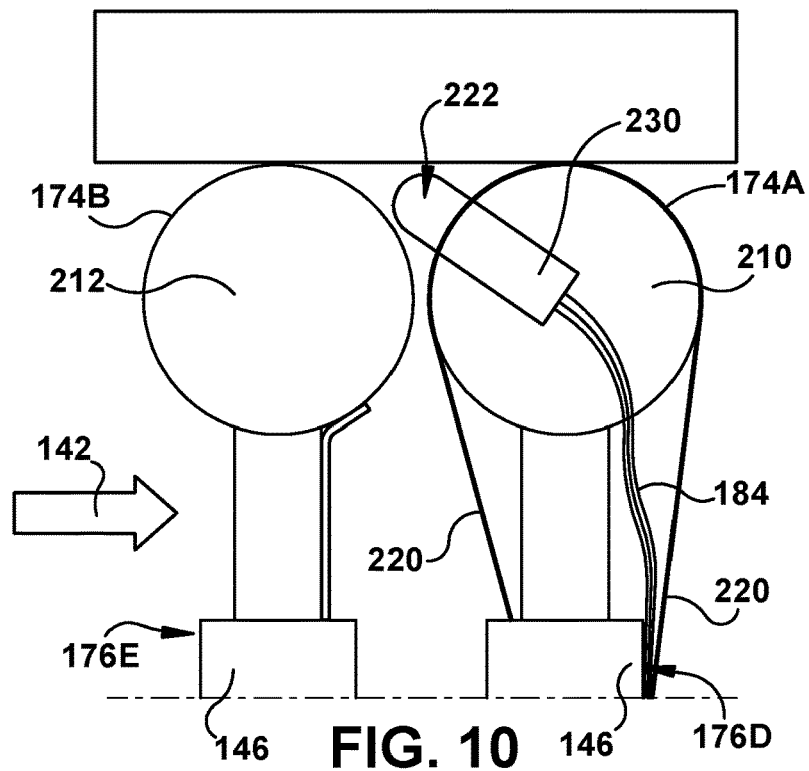
FIG. 10 shows an end view of ends of headers with the conduit through the baffle, according to embodiments of the disclosure.

FIG. 9 shows an enlarged perspective view of ends of a pair of adjacent headers 174A, 174B, and FIG. 10 shows an end view of the pair of adjacent headers 174A, 174B. Referring to FIG. 5 and the enlarged perspective view of FIG. 9, ends of adjacent headers 174 (174A, 174B in FIG. 9) do not extend to the same length (they have non-coplanar ends). Ends of headers 174, as shown in FIG. 5, may alternate in length. More particularly, as shown best in FIG. 9, an end 210 of header 174A of a first set 176D of heat exchange tubes 146 does not extend longitudinally to the same extent as an end 212 of adjacent header 174B of a second set 176E of heat exchange tubes 146. As shown in FIGS. 9 and 10 (not FIG. 5 for clarity), the shorter headers 174A include a baffle 220 extending from the end thereof, e.g., to prevent fluid 142 moving upwardly through the gap or to otherwise direct fluid 142 in a desired manner through heat exchanger 108. Baffles 220 may extend to the same longitudinal extent of adjacent header 174B. That is, end 212 of header 174B of second set 176E of heat exchange tubes 146 adjacent header 174A of first set 176D of heat exchange tubes 146 may extend to the same length as baffle 220 from end 210 of header 174A of first set 176D of heat exchange tubes 146.

Sensor leads 184 may need to extend upwardly between any two adjacent sets 176D, 176E (inner or outermost sets) of heat exchange tubes 146. In order to direct sensor leads 184 through baffle 220, heat exchanger 108 may also include a conduit 222 extending through baffle 220. Conduit 222 may include a plurality of sensor leads 184 of sensor grid 180 (FIG. 5) extending therethrough. In this manner, sensor leads 184 can be routed through baffle 220. Conduit 222 may take a variety of forms, but in the example shown includes a first length 230 extending along end 210 of header 174A of first set 176D of heat exchange tubes 146 and a second length 232 extending along a length of header 174A of first set 176D of heat exchange tubes 146. Where desired, first length 230 may be fixedly coupled to end 210 of header 174A, e.g., by a gusset or other connection. Although not necessary in all instances, first length 230 may be at a substantially perpendicular angle to second length 232. Conduit 222 may have any cross-sectional shape and may be formed in parts that are later fastened together, e.g., by welding, to allow routing of sensor leads 184 therethrough, e.g., in cases where sensor leads 184 are not very flexible. For example, conduit 222 may include a pair of longitudinally extending portions 234, 236 coupled together, e.g., half portions coupled along a weld joint 238. Conduit 222 may be made of any material capable of withstanding the environment of heat exchanger 108.

Sensor leads 184 may be routed along headers 174A, 174B, and eventually out through enclosure 140. In FIG. 5, sensor leads 184 are shown exiting through a roof 224 of enclosure 140; however, they may extend through any portion of enclosure 140. Sensor leads 184 may be coupled to control system 138 (FIG. 1) in any now known or later developed fashion for operational control of any number of parts of CCPP 100.

Embodiments of the disclosure also include a tube restraint 190 and a CCPP 100, as described herein. While a particular type of power plant and a particular type of CCPP 100 have been described herein, it is emphasized that the teachings of the disclosure are applicable to any type of heat exchanger.

As described herein, embodiments of the disclosure allow sensor grids 180 to be installed alongside any set 176 of heat exchange tubes 146. Sensor grid 180 thus can provide data about any portion of heat exchanger 108, even relative to inner sets 176C (FIG. 5) of heat exchange tubes 146. Installation of sensor grids 180 during manufacture of the sets is easier and faster than field installation and removes the installation of sensor grids 180 on the critical path of a site construction schedule. Sensor grids 180 also support online performance monitoring, active control of CCPP 100 efficiency optimization, and heat exchanger 108 component lifetime monitoring and optimization.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A heat exchanger, comprising:
   a plurality of sets of heat exchange tubes positioned adjacent each other, wherein the plurality of sets of heat exchange tubes includes a first set of heat exchange tubes and a second set of heat exchange tubes, each set of heat exchange tubes is fluidly coupled to at least one end of a respective header, and an end of the header of the first set of heat exchange tubes includes a baffle extending therefrom;
   a sensor grid positioned amongst the plurality of sets of heat exchange tubes, the sensor grid including a plurality of sensors, each sensor including a sensor lead extending therefrom;
   a conduit extending through the baffle, the conduit including a plurality of sensor leads of the sensor grid extending therethrough; and
   a tube restraint for positioning at least one of the plurality of sets of heat exchange tubes relative to an enclosure, the tube restraint including a tube opening for each of the heat exchange tubes of a respective set of heat exchange tubes and a sensor lead opening,
   wherein at least one sensor lead of the sensor grid extends through the sensor lead opening.

2. The heat exchanger of claim 1, wherein the first set of heat exchange tubes is a first outermost set of heat exchange tubes, the second set of heat exchange tubes is a second outermost set of heat exchange tubes, and the plurality of sets of heat exchange tubes further includes at least one inner set of heat exchange tubes between the first outermost set of heat exchange tubes and the second outermost set of heat exchange tubes, and wherein the sensor grid includes at least one sensor coupled to at least one heat exchange tube in the at least one inner set of heat exchange tubes.

3. The heat exchanger of claim 1, wherein an end of the header of the second set of heat exchange tubes adjacent the header of the first set of heat exchange tubes extends to the same length as the baffle extending from the end of the header of the first set of heat exchange tubes.

4. The heat exchanger of claim 1, wherein the conduit includes a first length extending along the end of the header of the first set of heat exchange tubes and a second length extending along a length of the header of the first set of heat exchange tubes.

5. The heat exchanger of claim 4, wherein the first length is fixedly coupled to the end of the header.

6. The heat exchanger of claim 4, wherein the first length is at a substantially perpendicular angle to the second length.

7. The heat exchanger of claim 1, wherein the conduit includes a pair of longitudinally extending portions coupled together.

8. The heat exchanger of claim 1, wherein the tube restraint comprises a body in which the tube opening for each of the heat exchange tubes of the respective set of heat exchange tubes is defined, the sensor lead opening is also defined in the body, and each tube opening has a larger dimension than the sensor lead opening.

9. A combined cycle power plant (CCPP), comprising:
   a gas turbine system;
   a steam turbine system; and
   a heat recovery steam generator (HRSG) coupled to the gas turbine system to create steam for the steam turbine system using an exhaust of the gas turbine system, wherein the HRSG includes:
   an enclosure configured to direct the exhaust therethrough;
   a plurality of sets of heat exchange tubes positioned adjacent each other in the enclosure, the plurality of sets of heat exchange tubes including a first set of heat exchange tubes and a second set of heat exchange tubes, each set of heat exchange tubes being fluidly coupled to at least one end of a respective header, and an end of the header of the first set of heat exchange tubes including a baffle extending therefrom;
   a sensor grid positioned amongst the plurality of set of heat exchange tubes, the sensor grid including a plurality of sensors, each sensor including a sensor lead extending therefrom;
   a conduit extending through the baffle, the conduit including a plurality of sensor leads of the sensor grid extending therethrough; and
   a tube restraint for positioning at least one of the plurality of sets of heat exchange tubes relative to the enclosure, the tube restraint including a tube opening for each of the heat exchange tubes of a respective set of heat exchange tubes and a sensor lead opening;
   wherein at least one sensor lead of the sensor grid extends through the sensor lead opening.

10. The CCPP of claim 9, wherein the first set of heat exchange tubes is a first outermost set of heat exchange tubes, the second set of heat exchange tubes is a second outermost set of heat exchange tubes, and the plurality of sets of heat exchange tubes further includes at least one inner set of heat exchange tubes between the first outermost set of heat exchange tubes and the second outermost set of heat exchange tubes, and wherein the sensor grid includes at least one sensor coupled to at least one heat exchange tube in the at least one inner set of heat exchange tubes.

11. The CCPP of claim 9, wherein an end of the header of the second set of heat exchange tubes adjacent the header of the first set of heat exchange tubes extends to the same length as the baffle extending from the end of the header of the first set of heat exchange tubes.

12. The CCPP of claim 9, wherein the conduit includes a first length extending along the end of the header of the first set of heat exchange tubes and a second length extending along a length of the header of the first set of heat exchange tubes.

13. The CCPP of claim 12, wherein the first length is fixedly coupled to the end of the header.

14. The CCPP of claim 12, wherein the first length is at a substantially perpendicular angle to the second length.

15. The CCPP of claim 9, wherein the conduit includes a pair of longitudinally extending portions coupled together.

16. The CCPP of claim 9, wherein the tube restraint comprises:
- a body;
- the tube opening for each of the heat exchange tubes being defined in the body and configured to receive one heat exchange tube of the set of heat exchange tubes therethrough; and
- the sensor lead opening being defined in the body and configured to receive a respective sensor lead therethrough,
- wherein each tube opening has a larger dimension than the sensor lead opening.

* * * * *